US010604615B2

(12) United States Patent
Moon et al.

(10) Patent No.: US 10,604,615 B2
(45) Date of Patent: Mar. 31, 2020

(54) RIGID POLYURETHANE FOAM AND PREPARATION METHOD THEREOF

(71) Applicant: CJ CHEILJEDANG CORPORATION, Seoul (KR)

(72) Inventors: Sun Joo Moon, Seoul (KR); Da Eun Kim, Seoul (KR); Jeung Yil Park, Seoul (KR); Sang Mok Lee, Seoul (KR); Min Ho Jung, Seoul (KR); Young Ran Kim, Seoul (KR); Jung Min Kim, Bucheon-si (KR); Jin Hwa Chang, Gunpo-si (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 0 days.

(21) Appl. No.: 15/529,040

(22) PCT Filed: Nov. 5, 2015

(86) PCT No.: PCT/KR2015/011828
§ 371 (c)(1),
(2) Date: May 23, 2017

(87) PCT Pub. No.: WO2016/085145
PCT Pub. Date: Jun. 2, 2016

(65) Prior Publication Data
US 2017/0253689 A1   Sep. 7, 2017

(30) Foreign Application Priority Data

Nov. 25, 2014 (KR) ........................ 10-2014-0165485

(51) Int. Cl.
| | |
|---|---|
| *C08G 18/64* | (2006.01) |
| *C08L 75/04* | (2006.01) |
| *C08L 97/00* | (2006.01) |
| *C08G 18/24* | (2006.01) |
| *C08J 9/04* | (2006.01) |
| *C08G 18/20* | (2006.01) |
| *C08G 18/08* | (2006.01) |
| *C08G 18/16* | (2006.01) |
| *C08G 18/48* | (2006.01) |
| *C08G 18/76* | (2006.01) |
| *C08J 9/00* | (2006.01) |
| *C08J 9/14* | (2006.01) |
| *C08G 101/00* | (2006.01) |

(52) U.S. Cl.
CPC ..... *C08G 18/6492* (2013.01); *C08G 18/0838* (2013.01); *C08G 18/14* (2013.01); *C08G 18/165* (2013.01); *C08G 18/2027* (2013.01); *C08G 18/2063* (2013.01); *C08G 18/244* (2013.01); *C08G 18/246* (2013.01); *C08G 18/4804* (2013.01); *C08G 18/4825* (2013.01); *C08G 18/7664* (2013.01); *C08J 9/0061* (2013.01); *C08J 9/04* (2013.01); *C08J 9/141* (2013.01); *C08L 75/04* (2013.01); *C08L 97/00* (2013.01); *C08G 2101/005* (2013.01); *C08G 2101/0025* (2013.01); *C08G 2101/0083* (2013.01); *C08J 2201/022* (2013.01); *C08J 2203/14* (2013.01); *C08J 2205/10* (2013.01); *C08J 2375/08* (2013.01)

(58) Field of Classification Search
CPC .. C08G 18/0838; C08G 18/14; C08G 18/165; C08G 18/2027; C08G 18/2063; C08G 18/244; C08G 18/246; C08G 18/4804; C08G 18/4825; C08G 18/6492; C08G 18/7664; C08G 2101/0025; C08G 2101/005; C08G 2101/0083; C08J 9/0061; C08J 9/04; C08J 9/141; C08J 2201/022; C08J 2203/14; C08J 2205/10; C08J 2375/08; C08L 75/04; C08L 97/00
See application file for complete search history.

(56) References Cited

U.S. PATENT DOCUMENTS

| | | | |
|---|---|---|---|
| 4,987,213 A | 1/1991 | Hirose et al. | |
| 9,593,221 B1 | 3/2017 | Kurple | |
| 2005/0014919 A1 | 1/2005 | Hatakeyama et al. | |
| 2009/0062516 A1* | 3/2009 | Belanger | C13K 13/00 530/502 |
| 2009/0069550 A1* | 3/2009 | Belanger | C07G 1/00 530/507 |
| 2011/0098384 A1 | 4/2011 | Blount | |
| 2013/0012610 A1 | 1/2013 | Belanger et al. | |
| 2015/0136121 A1* | 5/2015 | Jansen | B01D 15/1821 127/55 |

FOREIGN PATENT DOCUMENTS

| | | |
|---|---|---|
| CN | 101362818 | 9/2008 |
| CN | 103665300 A | 3/2014 |
| EP | 2677030 | 12/2013 |
| JP | S6445440 A | 2/1989 |
| JP | 2011184643 A | 9/2011 |

(Continued)

OTHER PUBLICATIONS

Extended European Search Report for Application No. 15863623.3 dated Jul. 9, 2018.
Japanese Office Action for Application No. 2017-528099 dated Apr. 24, 2018, citing the above reference(s).
International Search Report—PCT/KR2015/011828 dated Feb. 5, 2016.

(Continued)

*Primary Examiner* — John M Cooney
(74) *Attorney, Agent, or Firm* — Cantor Colburn LLP

(57) ABSTRACT

A rigid polyurethane foam which is a polymerization product of a composition including a concentrated acid hydrolytic lignin, a polyol, and an isocyanate, and a method of preparing the rigid polyurethane foam.

13 Claims, No Drawings

(56) References Cited

FOREIGN PATENT DOCUMENTS

WO 2014044234 3/2014

OTHER PUBLICATIONS

Written Opinion—PCT/KR2015/011828 dated Feb. 5, 2016.
Chinese Office Action for Application No. 201580064036.9 dated Feb. 3, 2019.

\* cited by examiner

RIGID POLYURETHANE FOAM AND PREPARATION METHOD THEREOF

TECHNICAL FIELD

The present disclosure relates to a rigid polyurethane foam and a method of preparing the rigid polyurethane foam.

BACKGROUND ART

With the expected depletion of fossil fuel resources such as petroleum or coal available as industrial raw materials, increasing attention has been focused on permanently usable biomass. Of biomass, lignocellulosic biomass is highly useful because there is no other competing use such as that of food resources. Lignocellulosic biomass is composed of carbohydrates such as cellulose and lignin. Lignin is a natural phenolic polymer which accounts for 15-20% of lignocellulosic biomass.

Rigid polyurethane foams have good insulation characteristics and flame retardant characteristics, and thus are widely used in insulating materials for refrigerators, freezers, and other conventional buildings, as well as in insulating panels and the like. In general, a rigid polyurethane foam may be prepared by reaction of a polyol and an isocyanate in the presence of a catalyst.

Recently, there have been attempts to use biomass-originating lignin in preparation of rigid polyurethane foams. For example, lignosulfonate obtained by a sulfite pulping process, alkali lignin obtained by a soda pulp process, a kraft lignin from kraft paper manufacturing process, and the like may be used.

However, these lignins do not dissolve easily in polyols and cause excessive cross-linking, which deteriorates physical properties in rigid polyurethane foams. To address these problems, a hydroxyl value of lignin may be reduced through chemical modification such as acetylation or esterification, so that lignin can be used in preparation of polyurethane. Therefore, there is a need for rigid polyurethane foams which may be prepared by partially substituting a petroleum-originating polyol with lignin without additional chemical modification.

DETAILED DESCRIPTION OF THE INVENTION

Technical Problem

The present disclosure provides a novel rigid polyurethane foam and a method of preparing the rigid polyurethane foam.

Technical Solution

According to an aspect of the present disclosure, there is provided a rigid polyurethane foam which is a polymerization product of a composition including a concentrated acid hydrolytic lignin, a polyol, and an isocyanate.

According to an aspect of the present disclosure, there is provided an article including the above-described rigid polyurethane foam.

According to an aspect of the present disclosure, there is provided a method of preparing the rigid polyurethane foam, the method including reacting a concentrated acid hydrolytic lignin, a polyol, and an isocyanate in the presence of a foam stabilizing agent, a catalyst, and a foaming agent.

Advantageous Effects of the Invention

As described above, according to the one or more embodiments, a rigid polyurethane foam having good physical properties may be prepared using lignin which originates from biomass, without an additional chemical modification.

Best Mode

Hereinafter, example embodiments of a rigid polyurethane foam and a method of preparing the same will be described in greater detail.

According to an aspect of the present application, a rigid polyurethane foam is provided which is a polymerization product of a composition including a concentrated acid hydrolytic lignin, a polyol, and an isocyanate. The rigid polyurethane foam may be prepared without additional chemical modification needed for conventional lignins, in order to have superior properties. In particular, by using the concentrated acid hydrolytic lignin, the rigid polyurethane foam may be prepared through fewer preparation steps, and its density, compression strength, flame retardancy and the like can be improved, as compared to conventional rigid polyurethane forms prepared using other lignins.

The concentrated acid hydrolytic lignin used in the rigid polyurethane foam may be separated from a hydrolysate which is obtained by hydrolysis of lignocellulosic biomass with a concentrated acid. For example, the concentrated acid hydrolytic lignin may be prepared using the following method. First, lignocellulosic biomass may be mixed with a concentrated acid. Subsequently, the resulting mixture may be diluted by addition of excess water, followed by filtration. The resulting residue may be washed with water to obtain a residue having a neutral pH. The neutral residue may then be dried to yield lignin as a dry powder.

For example, the concentrated acid hydrolytic lignin as a dry powder may have a pH of about 4 to about 7. By using the concentrated acid hydrolytic lignin having a pH within this range, the rigid polyurethane foam may be obtained with superior properties. When the concentrated acid hydrolytic lignin has a pH of less than 3, the rigid polyurethane foam may cause corrosion when used to protect reinforcing steel.

The concentrated acid used to prepare the concentrated acid hydrolytic lignin may be hydrochloric acid. However, embodiments are not limited thereto. For example, the concentrated acid may be any concentrated acid available in the art that does not deteriorate physical properties of the rigid polyurethane foam, and for example, may be sulfuric acid, nitric acid, phosphoric acid, or a Lewis acid.

The amount of the concentrated acid hydrolytic lignin used to prepare the rigid polyurethane foam may be about 1 wt % to about 40 wt % based on a total weight of a mixture of the polyol and the concentrated acid hydrolytic lignin. For example, the amount of the concentrated acid hydrolytic lignin in the mixture of the polyol and the concentrated acid hydrolytic lignin may be about 10 wt % to about 35 wt %, and in some embodiments, about 10 wt % to about 30 wt %, and in some other embodiments, about 10 wt % to about 20 wt %, based on a total weight of the mixture of the polyol and the concentrated acid hydrolytic lignin. When the amount of the concentrated acid hydrolytic lignin exceeds 40 wt %, the mixture of the polyol and the concentrated acid hydrolytic lignin may have an excessively increased viscosity, and may be prone to hardening, thus making it difficult to prepare the rigid polyurethane foam.

The concentrated acid hydrolytic lignin used to prepare the rigid polyurethane foam may have a hydroxyl value falling within a hydroxyl value range of the polyol. That is, the concentrated acid hydrolytic lignin may have a hydroxyl value within the same range of that of the polyol used to prepare the rigid polyurethane foam. As the concentrated acid hydrolytic lignin has a hydroxyl value within the same range of that of the polyol, it may be possible to prevent deterioration in physical properties of the polyurethane foam that may likely occur from the use of the concentrated acid hydrolytic lignin.

The concentrated acid hydrolytic lignin used in the rigid polyurethane foam may have a hydroxyl value of about 500 mg KOH/g or less. For example, the concentrated acid hydrolytic lignin used in the rigid polyurethane foam may have a hydroxyl value of about 300 mg KOH/g to about 500 mg KOH/g. When the concentrated acid hydrolytic lignin has a hydroxyl value less than 300 mg KOH/g, the mixture of the concentrated acid hydrolytic lignin and the polyol may have an excessively increased viscosity, or the rigid polyurethane foam may have reduced mechanical strength. When the concentrated acid hydrolytic lignin has a hydroxyl value greater than 500 mg KOH/g, the concentrated acid hydrolytic lignin may have a molecular weight distribution having a large amount of the unreactable alcohol, leading to weakened brittleness of the polyurethane. Accordingly, the amount of the isocyanate required for reacting with the mixture of the concentrated acid hydrolytic lignin and the polyol may increase, and a molar ratio of the polyol to the isocyanate may exceed an appropriate range.

For example, the rigid polyurethane foam prepared using the concentrated acid hydrolytic lignin, the polyol, and the isocyanate may have a density of about 25.0 kg/m$^3$ or greater. For example, the rigid polyurethane foam may have a density of about 25.0 kg/m$^3$ to about 70 kg/m$^3$. When the rigid polyurethane foam has a density of less than 25.0 kg/m$^3$, the rigid polyurethane foam may have reduced flame retardancy or reduced mechanical strength. When the rigid polyurethane foam has a density of 70 kg/m$^3$ or greater, the cost of the rigid polyurethane foam may be excessive.

The rigid polyurethane foam prepared using a composition which includes the concentrated acid hydrolytic lignin, the polyol, and the isocyanate may have a compression strength of about 0.005 kgf/mm$^2$ or greater, for example, about 0.005 kgf/mm$^2$ to about 0.05 kgf/mm$^2$. When the rigid polyurethane foam has a compression strength of less than 0.005 kgf/mm$^2$, the rigid polyurethane foam may have reduced flame retardancy or reduced mechanical strength. When the rigid polyurethane foam has a compression strength greater than 0.05 kgf/mm$^2$, the production cost thereof may be excessive.

According to another aspect of the present application, an article including the rigid polyurethane foam according to any of the above-described embodiments is provided. The article may be a polyurethane foam molded product. The polyurethane foam molded product may be automotive parts, machine parts, industrial parts, wires, cables, rolls, hoses, tubes, belts, films, sheets, laminated products, coatings, adhesives, sealants, sporting goods, leisure goods, shoe-related parts, accessories, nursing goods, housing goods, medical goods, building materials, civil engineering-related materials, waterproof materials, packaging materials, heat-insulating materials, cold-insulating materials, slush powder (i.e., superabsorbent powder), or the like. The rigid polyurethane foam may include a sheet material on one surface or both opposite surfaces thereof. The sheet material may be, for example, paper, wood, gypsum plasterboard, resin, aluminum foil, or a steel plate.

According to another aspect of the present application, a method of preparing the rigid polyurethane foam according to any of the above-described embodiments includes reacting a concentrated acid hydrolytic lignin, a polyol, and an isocyanate in the presence of a foam stabilizing agent, a catalyst, and a foaming agent. By this method, the rigid polyurethane foam may be prepared such that it has superior properties, for example, in terms of density and compression strength.

In some embodiments of the preparation method, the reacting of the concentrated acid hydrolytic lignin, the polyol, and the isocyanate may include: preparing a premix including the concentrated acid hydrolytic lignin, the polyol, a foam stabilizing agent, a catalyst, and a foaming agent; and reacting the premix with the isocyanate.

In some embodiments, the preparation method may further include, prior to the preparing of the premix, mixing the concentrated acid hydrolytic lignin and the polyol to prepare a mixture.

In some embodiments of the preparation method, the mixing of the concentrated acid hydrolytic lignin and the polyol may be performed at a temperature of about 50° C. to about 85° C. for about 0.5 hours to about 2 hours. By mixing at this temperature, the viscosity of the polyol may be reduced, which may facilitate mixing of the concentrated acid hydrolytic lignin and the polyol. After the concentrated acid hydrolytic lignin and the polyol are completely mixed, the mixture may be cooled to a temperature of about 45° C. or less to suppress volatilization of other added materials.

In the preparation method, the amount of the concentrated acid hydrolytic lignin may be the same as described above in connection with embodiments of the rigid polyurethane foam.

The polyol used in the preparation method may be a polyether polyol, a polyester polyol, a polyolefin polyol, a low-molecular weight polyol, a flame-retardant polyol, an acrylic polyol, or a plant-originating polyol. However, embodiments are not limited thereto. Any polyols known in the art that can be used in preparation of a rigid polyurethane foam may be used.

Examples of the polyether polyol may include polyethylene glycol, polypropylene glycol, and polytetramethylene ether glycol. Examples of the polyester polyol may include an adipate polyol, a polycaprolactone polyol, an aromatic polyester polyol, and a polycarbonate diol. For example, the adipate polyol may be ethylene glycol adipate, diethylene glycol adipate, butylene glycol adipate, and trimethylolpropane/diethylene glycol adipate. Examples of the polyolefin polyol may include polybutadiene polyol, hydrogenated polybutadiene polyol, and hydrogenated polyisoprene polyol. Examples of the low-molecular weight polyol may include 1,4-butanediol, 1,6-hexanediol, 1,3-propanediol, and 2-methyl-propane diol. Examples of the flame-retardant polyol may include a phosphorous-containing polyol, a halogen-containing polyol, and a phenolic polyol. Examples of the plant-originating polyol may include polyols originating from castor oil, soy bean oil, or palm oil. The above-listed polyols may be used individually or in a combination of at least two thereof.

The polyol may have a molecular weight of about 400 to about 8,000. For example, the polyol may have a molecular weight of about 450 to about 5,000, and in some embodiments, a molecular weight of about 500 to about 3,000. When the polyol has a molecular weight less than 400, the rigid polyurethane foam may have reduced flexibility or reduced heat resistance. When the polyol has a molecular weight greater than 8,000, the polyol may have reduced miscibility with other polyols or isocyanates, such that a uniform polyurethane foam may not be obtained.

The polyol may have a hydroxyl value of about 20 mgKOH/g to about 500 mgKOH/g. The number of functional groups per molecule of the polyol may be 2.0 to 8.0.

In the preparation method, the isocyanate may have an isocyanate index of about 50 to about 500. The isocyanate index may be defined by the following equation:

Isocyanate index=100+(Used amount of NCO)/ (Theoretically required amount of NCO)

For example, the isocyanate may have an isocyanate index of about 50 to about 300, and in some embodiments, about 50 to about 200. When the isocyanate index exceeds 500, the rigid polyurethane foam may have increased brittleness and reduced adhesion strength. When the isocyanate index is less than 50, the rigid polyurethane foam may have reduced flame-retardancy and reduced compression strength.

The isocyanate used in the preparation method is not particularly limited as long as it is a polyisocyanate having at least two or more isocyante groups per one molecule. Examples of the polyisocyanate may be an aliphatic isocyanate, an alicyclic isocyanate, an aromatic isocyanate, or a modified product thereof. Examples of the aliphatic isocyanate may be hexamethylene diisocyanate, lysine diisocyanate, or lysine triisocyanate. For example, the alicyclic isocyanate may be isophorone diisocyanate. Examples of the aromatic isocyanate may be toluene diisocyanate, xylylene diisocyanate, diphenylmethane diisocyanate, polymeric diphenylmethane diisocyanate, triphenylmethane triisocyanate, or tris(isocyanate phenyl)thiophosphate. Examples of the modified isocyanate product may be a urethane prepolymer, a hexamethylene diisocyanate biuret, a hexamethylene diisocyanate trimer, or an isophorone diisocyanate trimer. For example, a plant-originating isocyanate, originating, for example, from castor oil may be used. These isocyanates may be used alone or in a combination of at least two thereof.

As a urethanization catalyst, a tertiary amine may be used as the catalyst used in the preparation method. A metal salt and/or a quaternary ammonium salt may also be used as a trimerization catalyst. In the preparation method, when an isocyanate is used, a urethanization catalyst and a trimerization catalyst may be used in combination. For example, a tertiary amine, and a metal salt and/or a quaternary ammonium salt may be used in combination.

Examples of the tertiary amine may be N,N,N',N'-tetramethylethylenediamine, N,N,N',N'-tetramethylpropylenediamine, N,N,N',N'',N''-pentamethyldiethylenetriamine, N,N,N',N'',N''-pentamethyl-(3-aminopropyl)ethylenediamine, N,N, N',N'', N''-pentamethyldipropylenetriamine, N,N,N',N'-tetramethylguanidine, 1,3,5-tris(N,N-dimethylaminopropyl) hexahydro-s-triazine, 1,8-diazabicyclo[5.4.0]undecene-7, triethylenediamine, N,N,N',N'-tetramethylhexamethylenediamine, N,N'-dimethylpiperazine, dimethylcyclohexylamine, N-methylmorpholine, N-ethylmorpholine, bis(2-dimethylaminoethyl)ether, 1-methylimidazole, 1,2-dimethylimidazole, 1-isobutyl-2-methylimidazole, 1-dimethylaminopropylimidazole, or N-methyl-N—(N,N-dimethylaminoethyl) ethanolamine. However, embodiments are not limited thereto. Any amine catalyst available in the art may be used.

The metal salt may be, for example, a potassium salt, a tin salt, or a lead salt. For example, the metal salt may be potassium acetate, potassium 2-ethlhexanoate, dibutyltin dilaurate, tin octylate, lead octylate, or bismuth 2-ethylhexanoate. However, embodiments are not limited thereto. Any metal catalyst available in the art may be used.

The quaternary ammonium salt may be, for example, a quaternary ammonium compound obtained by an anion exchange reaction of 2-ethylhexane with a quaternary ammonium carbonate obtained by reacting a carbonic acid diester with a tetraalkylammonium halide such as tetramethylammonium chloride, a tetraalkylammonium hydroxide such as a tetramethylammonium hydroxide; a tetraalkylammonium organic acid salt such as a tetramethylammonium-2-ethylhexanoic acid salt, a 2-hydroxypropyl trimethylammonium formate, or a 2-hydroxypropyl trimethylammonium 2-ethylhexanoic acid salt; or a tertiary amine such as N,N, N'N'-tetramethylethylenediamine.

The amount of the catalyst may be from about 0.1 parts to about 5 parts by weight based on 100 parts by weight of the mixture of the concentrated acid hydrolytic lignin and the polyol. However, embodiments are not limited thereto. The amount of the catalyst may be appropriately adjusted within a range in which the rigid polyurethane foam may be prepared to have improved physical properties. The reactivity of the mixture of the concentrated acid hydrolytic lignin and the polyol with isocyanate may be controlled according to an amount of the catalyst used. That is, it may be possible to control the time it takes from the start of the mixing to the termination of foaming as determined visually.

The foaming agent in the preparation method may be, for example, a hydrochlorofluorocarbon (HCFC) foaming agent, such as HCFC-141b, HCFC-142b, HCFC-124, or HCFC-22; a hydroxyfluorocarbon (HFC) foaming agent such as 1,1,1,2-tetrafluoroethane (HFC-134a), 1,1,1,3,3-pentafluoropropane (HFC-245fa), 1,1,1,3,3-pentafluorobutane (HFC-365mfc), 1,1,2,2-tetrafluoroethyldifluoromethylether (HFE-236pc), 1,1,2,2-tetrafluoroethylmethylether (HFE-254pc), or 1,1,1,2,2,3,3-heptafluoropropylmethylether (HFE-347mcc); a hydrocarbon foaming agent such as butane, hexane, cyclohexane, normal pentane (n-pentane), iso-pentane, or cyclopentane; water; or an inert gas such as air, nitrogen, or carbon dioxide. However, embodiments are not limited thereto. Any foaming agent available in the art may be used. The inert gas may be added in a liquid state, a supercritical state, or a subcritical state. The above-listed foaming agent, except for water, may be used individually or in a combination of at least two thereof.

When water is used as the foaming agent, the amount of the water may be from about 0.5 parts to about 10 parts by weight, for example, about 0.5 parts to about 7 parts by weight, based on 100 parts by weight of the mixture of the concentrated acid hydrolytic lignin and the polyol. When a pentane (n-pentane, iso-pentane, and/or cyclopentane) is used as the foaming agent, the amount of the pentane (n-pentane, iso-pentane, and/or cyclopentane) may be about 0.5 parts to about 60 parts by weight, for example, about 0.5 parts to about 50 parts by weight, based on 100 parts by weight of the mixture of the concentrated acid hydrolytic lignin and the polyol.

The foam stabilizing agent (surfactant) used in the preparation method may be, for example, a silicon-based foam stabilizing agent or a fluorine-containing compound-based foam stabilizing agent. However, embodiments are not limited thereto. Any foam stabilizing agent available in the art may be used. For example, a silicon-based foam stabilizing agent may be used to obtain stable foam.

For example, the silicon-based foam stabilizing agent may be a compound including a copolymer of dimethylpolysiloxane and polyether, for example, SZ-1671, SZ-1718, SH-193, or SZ-1642 (available from Dow Corning Toray Co., Ltd); L-6884, L-5440, or L-5420 (available from Momentive); or B8443, B8490, or B8460 (available from Evonik).

The amount of the foam stabilizing agent may be from about 0.1 parts to about 10 parts by weight based on 100 parts by weight of the mixture of the concentrated acid hydrolytic lignin and the polyol. For example, the amount of the foam stabilizing agent may be from about 0.3 parts to about 5 parts by weight based on 100 parts by weight of the mixture of the concentrated acid hydrolytic lignin and the polyol.

In some embodiments, in the preparation method, a flame-retardant agent may optionally be used.

Examples of the flame-retardant agent may be a phosphoric acid ester, such as triethyl phosphate, tributyl phosphate, trischloroethyl phosphate, trischloropropyl phosphate (TCPP), triphenyl phosphate, tricresyl phosphate, or polyphosphoric acid; a phosphoric acid compound such as phosphorous ester; or a chlorinated paraffin.

To ensure both improved mechanical properties and improved flame retardancy in a rigid form, the amount of the flame-retardant agent may be about 10 parts to about 60 parts by weight based on 100 parts by weight of the mixture of the concentrated acid hydrolytic lignin and the polyol. For example, the amount of the flame-retardant agent may be from about 20 parts to about 40 parts by weight based on 100 parts by weight of the mixture of the concentrated acid hydrolytic lignin and the polyol.

In some embodiments, in the preparation method, an additional compounding agent may further be used. In addition to the concentrated acid hydrolytic lignin, the polyol, the isocyanate, the catalyst, the foaming agent, and the foam stabilizing agent as described above, any compounding agent may further be used. Examples of the compounding agent may be a filling agent such as calcium carbonate or barium sulfate; an anti-aging agent such as an antioxidant or an ultraviolet (UV) light absorber; a plasticizer; a coloring agent; an antifungal agent; a foam breaking agent; a dispersing agent; or a discoloration preventing agent

MODE OF THE INVENTION

One or more embodiments of the present disclosure will now be described in detail with reference to the following examples. However, these examples are only for illustrative purposes and are not intended to limit the scope of the one or more embodiments of the present disclosure.

(Preparation of Rigid Polyurethane Foam)

EXAMPLE 1

Pine-Originating Concentrated Acid Hydrolytic Lignin (Preparation of Concentrated Acid Hydrolytic Lignin)

A pine was used as lignocellulosic biomass. After the pine was pulverized to a diameter of about 0.8 mm or less, the pulverized pine tree as a source material was mixed with 42% hydrochloric acid in a weight ratio of about 1:5 (w/v) and stirred at about 20° C. for about 5 hours, and excess water was added to the mixture to dilute the hydrochloric acid. Subsequently, the diluted solution was filtered through a stainless steel sieve (325-ASTM). The resulting filtrate was washed with water to reach a pH of 4 or greater, and then dried in a 70° C. oven to yield hydrochloric acid-hydrolytic lignin. The sugar content of the hydrochloric acid-hydrolytic lignin was less than 5 wt %, and the chlorine content was about 1 wt % or less.

(Preparation of Premix)

10 g of the prepared concentrated acid hydrolytic lignin and 90 g of a commercially available liquid polyol (Lupranol® 3422, polypropylene glycol, Mw=600, available from BASF) were added into a reactor and stirred at about 300 rpm at about 85° C. for about 1 hour to prepare a mixture of the concentrated acid hydrolytic lignin and the polyol. The temperature of the mixture was cooled to about 45° C. 1.5 g of a silicon foam stabilizing agent (TEGOSTAB® B-8409, available from Evonik Industries), 2.0 g of an amine catalyst (Dabco® 33-LV, available from Air Products and Chemicals, Inc.) as a main catalyst, 0.3 g of a tin catalyst (DBTDL, dibutyltin dilaurate, available from Sigma) as an auxiliary catalyst, and 28.5 g of n-pentane as a foaming agent were added to 100 g of the mixture to prepare a premix. The composition of the premix in each example is shown in Table 1.

(Preparation of Rigid Polyurethane Foam)

A rigid polyurethane foam was prepared by adding 119 g of an isocyanate (polymeric MDI, Suprasec 5005, available from NISCHEM) to the premix. The added amount of the isocyanate was determined according to the amounts of hydroxyl groups and the amounts of foaming agent in the premix, so that there was an isocyanate index of about 100.

The premix and the isocyanate were quickly put into a 1-liter polyethylene container at room temperature, and stirred at about 3,000 rpm for about 3 seconds to cause foaming within the 1-liter polyethylene container, resulting in the rigid polyurethane foam.

EXAMPLES 2-10

Rigid polyurethane foams were prepared in the same manner as in Example 1, except that the compositions of the rigid polyurethane foams were changed. The compositions of the rigid polyurethane foams are shown in Table 1.

COMPARATIVE EXAMPLE 1

A rigid polyurethane foam was prepared in the same manner as in Example 1, except that no concentrated acid hydrolytic lignin was used, and 100 g of the commercially available polyol was used.

COMPARATIVE EXAMPLE 2

A rigid polyurethane foam was prepared in the same manner as in Example 1, except that the amount of the concentrated acid hydrolytic lignin was changed to 50 g.

TABLE 1

| Example | Commercially available polyol | Lignin | Foam stabilizing agent | Catalyst | Foaming agent | Isocyanate |
|---|---|---|---|---|---|---|
| Example 1 | 90 | 10 | 1.5 | 2.3 | 28.5 | 119 |
| Example 2 | 90 | 10 | 1.5 | 2.3 | 47.0 | 119 |
| Example 3 | 90 | 10 | 1.5 | 2.3 | 1.0 (water) | 134 |
| Example 4 | 80 | 20 | 1.5 | 2.3 | 28.5 | 115 |
| Example 5 | 70 | 30 | 1.5 | 2.3 | 28.5 | 112 |
| Example 6 | 70 | 30 | 1.5 | 2.3 | 47.0 | 112 |
| Example 7 | 70 | 30 | 1.5 | 2.3 | 1.0 (water) | 127 |
| Example 8 | 60 | 40 | 1.5 | 2.3 | 28.5 | 108 |
| Example 9 | 60 | 40 | 1.5 | 2.3 | 47.0 | 108 |
| Example 10 | 60 | 40 | 1.5 | 2.3 | 1.0 (water) | 124 |
| Comparative Example 1 | 100 | 0 | 1.5 | 2.3 | 28.5 | 122 |
| Comparative Example 2 | 50 | 50 | 1.5 | 2.3 | 28.5 | 105 |

In Table 1, the amounts of individual components are represented in units of grams (g). In Examples 3, 7, and 10, as the foaming agent, water was used instead of n-pentane.

EVALUATION EXAMPLE 1

Hydroxyl Value Calculation

The content of hydroxyl groups in the concentrated acid hydrolytic lignin was determined by a test method (ASTM D 4274-99). The hydroxyl value is defined as the weight (in milligrams) of potassium hydroxide (mgKOH) required to neutralize acetic acid in an acetylated compound obtained from 1 g of the polyol.

10 mL of pyridine and 1.3 mL of acetic anhydride were added to both 0.2 g of the concentrated acid hydrolytic lignin and a blank, which were then reacted in a 98±2° C. water bath for about 2 hours and then cooled down to room temperature. After 30 mL of deionized water was added to each of the reaction solutions, the reaction solutions were transferred to conical tubes, and deionized water was further added to each of the conical tubes to a volume of about 45.5 mL. Supernatant was collected from each of the reaction solutions. 40 mL of deionized water was further added to the precipitate in each of the conical tubes, followed by centrifugation and further collection of supernatant. This supernatant was added to the previously collected supernatant. 1 mL of a 1% phenolphthalein solution was added to the collected supernatant and titrated with a 0.5N NaOH solution while stirring until the color of the solution was changed to faint pink. At this point of the titration, the amount of NaOH added was measured. The hydroxyl value was calculated from the added amount of NaOH, using Equation 2.

Hydroxyl value (mgKOH/g)=[(Amount (mL) of the NaOH solution added to the blank−Amount (mL) of the NaOH solution added to the lignin)×Concentration of the NaOH solution (N)×56.1]/Added amount (g) of the lignin  <Equation 2>

The hydroxyl value of the pine-originating concentrated acid hydrolytic lignin of Example 1 was about 350 mgKOH/g, and the hydroxyl value of the pine-originating concentrated acid hydrolytic lignin of Example 13 was about 419 mgKOH/g. The hydroxyl value of the commercially available polyol used in the preparation of the rigid polyurethane foams was about 350-560 mgKOH/g, and the hydroxyl value of the concentrated acid hydrolytic lignin was within the hydroxyl value range of the commercially available polyol.

EVALUATION EXAMPLE 2

Reactivity

A cream time and a gel time were measured, wherein the cream time was the time taken from the start time (set to 0 (sec)) of mixing of the premix and the isocyanate until foaming started in each source foaming composition, and wherein the gel time was the time taken from the beginning of the foaming in each source foaming composition until the rigid foam stopped rising. The measurement results are shown in Table 2. The shorter the cream time and the gel time are, the greater the improvement in reactivity.

EVALUATION EXAMPLE 3

Measurement of Density (Cup Free Density)

A core region of each rigid polyurethane foam was cut into a cube of dimensions of 70 mm (length)×70 mm (width)×70 mm (thickness), and a density thereof (kg/m³) was calculated from its weight and volume. The results are shown in Table 2.

EVALUATION EXAMPLE 4

Compression Strength Measurement

The compression strength of each of the rigid polyurethane foams when compressed by 25% relative to the original thickness was measured using a JIS K-6400 test method. The results are shown in Table 2.

TABLE 2

| Example | Reactivity | | Density [kg/m³] | Compression strength [kgf/mm²] |
|---|---|---|---|---|
| | Cream time [sec] | Gel time [sec] | | |
| Example 1 | 65 | 200 | 26.4 | 0.013 |
| Example 5 | 60 | 190 | 25.8 | 0.011 |
| Example 8 | 60 | 190 | 25.5 | 0.009 |
| Comparative Example 1 | 65 | 200 | 27.6 | 0.013 |
| Comparative Example 2 | — | — | — | — |

Referring to Table 2, the rigid polyurethane foams of Examples 1, 5, and 8 had similar physical properties and improved reactivity as compared with those of the rigid polyurethane foam of Comparative Example 1 not including lignin.

In Comparative Example 2, due to an increased viscosity of the premix, a rigid polyurethane foam failed to properly form.

Therefore, it was understood that a rigid polyurethane foam can be prepared by mere partial substitution of a polyol with concentrated acid hydrolytic lignin, without additional chemical modification of the concentrated acid hydrolytic lignin.

INDUSTRIAL APPLICABILITY

As described above, according to the one or more embodiments, a rigid polyurethane foam having superior properties may be prepared using lignin derived from biomass, without additional chemical modification of the lignin.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

The invention claimed is:

1. A rigid polyurethane foam which is a polymerization product of a composition comprising a concentrated acid hydrolytic lignin powder having a pH of 4-7, a polyol, and an isocyanate,
   wherein the concentrated acid hydrolytic lignin is a lignin separated from a hydrolysate obtained by hydrolysis of lignocellulosic biomass with a concentrated acid,
   wherein an amount of the concentrated acid hydrolytic lignin is 1 wt % to 40 wt % based on a total weight of a mixture of the polyol and the concentrated acid hydrolytic lignin.

2. The rigid polyurethane foam of claim 1, wherein the concentrated acid is selected from the group consisting of hydrochloric acid, sulfuric acid, nitric acid, and a Lewis acid.

3. The rigid polyurethane foam of claim 1, wherein an amount of the concentrated acid hydrolytic lignin is 10 wt % to 30 wt % based on a total weight of a mixture of the polyol and the concentrated acid hydrolytic lignin.

4. The rigid polyurethane foam of claim 1, wherein a hydroxyl value of the concentrated acid hydrolytic lignin is from 300 mg KOH/g to 500 mg KOH/g.

5. An article comprising the rigid polyurethane foam according to claim 1.

6. A method of preparing a rigid polyurethane foam of claim 1, the method comprising reacting concentrated acid hydrolytic lignin powder having pH of 4-7, a polyol, and an isocyanate in the presence of a foam stabilizing agent, a catalyst, and a foaming agent,
   wherein concentrated acid hydrolytic lignin is a lignin separated from a hydrolysate obtained by hydrolysis of lignocellulosic biomass with a concentrated acid,
   wherein an amount of the concentrated acid hydrolytic lignin is 1 wt % to 40 wt % based on a total weight of a mixture of the polyol and the concentrated acid hydrolytic lignin.

7. The method of claim 6, wherein the reacting of the concentrated acid hydrolytic lignin powder having pH of 4-7, the polyol, and the isocyanate comprises:
   preparing a premix comprising the concentrated acid hydrolytic lignin powder having pH of 4-7, the polyol, the foam stabilizing agent, the catalyst, and the foaming agent; and
   reacting the premix with the isocyanate.

8. The method of claim 6, further comprising, prior to the preparing of the premix, mixing the concentrated acid hydrolytic lignin powder having pH of 4-7 and the polyol to prepare a mixture.

9. The method of claim 8, wherein the mixing of the concentrated acid hydrolytic lignin powder having pH of 4-7 and the polyol is performed at a temperature of 50° C. to 85° C. for 0.5 hours to 2 hours.

10. The method of claim 8, wherein an amount of the concentrated acid hydrolytic lignin powder having pH of 4-7 is 1 wt % to 40 wt % based on a total weight of the mixture of the polyol and the concentrated acid hydrolytic lignin powder having pH of 4-7.

11. An article comprising the rigid polyurethane foam according to claim 2.

12. An article comprising the rigid polyurethane foam according to claim 3.

13. An article comprising the rigid polyurethane foam according to claim 4.

* * * * *